Figure 1:
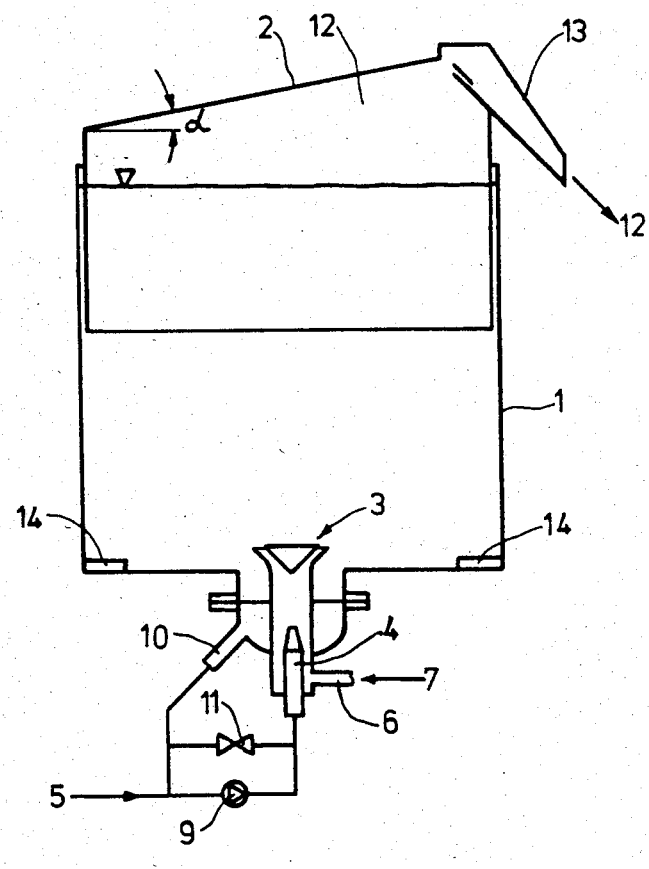

United States Patent [19]

Zlokarnik et al.

[11] Patent Number: 4,585,561
[45] Date of Patent: Apr. 29, 1986

[54] FLOTATION PROCESS FOR THE CONTINUOUS RECOVERY OF SILVER OR SILVER COMPOUNDS FROM SOLUTIONS OR DISPERSIONS

[75] Inventors: Marko Zlokarnik, Cologne; Georg Schindler, Leverkusen; Günther Koepke, Odenthal; Werner Stracke, Leverkusen, all of Fed. Rep. of Germany

[73] Assignee: Agfa-Gevaert Aktiengesellschaft, Leverkusen, Fed. Rep. of Germany

[21] Appl. No.: 721,125

[22] Filed: Apr. 8, 1985

Related U.S. Application Data

[63] Continuation of Ser. No. 516,530, Jul. 25, 1983, abandoned.

[51] Int. Cl.[4] ............................................. C02F 1/24
[52] U.S. Cl. ..................... 210/705; 75/118 P; 210/725; 210/912; 423/26; 423/34; 430/398
[58] Field of Search .................. 75/118 R, 118 P; 210/703–707, 221.1, 221.2, 912, 725; 423/26, 34; 430/398–400

[56] References Cited

U.S. PATENT DOCUMENTS

| 2,196,764 | 4/1940 | Folwell | 75/118 P |
| 2,290,206 | 7/1942 | Pool | 75/118 P |
| 3,501,378 | 3/1970 | Shinkai | 75/118 P |
| 3,982,932 | 9/1976 | Korosi | 423/34 |
| 4,005,009 | 1/1977 | Kinoshita et al. | 210/705 |
| 4,087,282 | 5/1978 | Mitsui et al. | 210/725 |
| 4,517,282 | 5/1985 | Tomisawa et al. | 430/399 |

FOREIGN PATENT DOCUMENTS

| 53-9530 | 1/1978 | Japan | 75/118 P |
| 53-142974 | 12/1978 | Japan | 210/705 |
| 860542 | 2/1961 | United Kingdom | 423/26 |

Primary Examiner—Peter Hruskoci
Attorney, Agent, or Firm—Connolly and Hutz

[57] ABSTRACT

A flotation process for the continuous recovery of silver or silver compounds from solutions or dispersions is described, wherein finely divided, inert gas bubbles are injected into the dispersions of silver and silver compounds in the presence of protein and the pH of the medium is maintained at the isoelectric point of the protein. Addition of a surface active agent accelerates the process. The desilverized effluent has a silver content of less than 1 mg of Ag/l. The quantity of flotate (12) is less than 2% of the quantity of effluent (5) put into the process.

10 Claims, 5 Drawing Figures

FLOTATION PROCESS FOR THE CONTINUOUS RECOVERY OF SILVER OR SILVER COMPOUNDS FROM SOLUTIONS OR DISPERSIONS

CROSS REFERENCE TO RELATED APPLICATION

This is a continuation of U.S. patent application Ser. No. 516,530, filed July 25, 1983 now abandoned, entitled Flotation Process for the Continuous Recovery of Silver or Silver Compounds from Solutions or Dispersions by Mzrko Zlokarnik, Georg Schindler, Gunther Koepke and Werner Stracke.

This invention relates to a flotation process for the continuous recovery of silver or silver compounds, in particular silver and silver halides, from dispersions.

The preparation and processing of photographic materials is accompanied by the formation of effluent containing silver or silver compounds. The silver in these effluents, as well as in other silver-containing effluents, must be removed and recovered as completely as possible both for economic reasons and on account of the toxic effect of silver. The discharge of effluent containing silver into the sewerage is prohibited because of the anti-bacterial action of such sewerage (at the present time the officially permitted limit of silver in the effluent is 2 mg/l).

Numerous processes for the desilverization of effluent containing silver, silver halides, organic and inorganic substances, as well as gelatine, in the aqueous mixture are known.

Thus, for example, the silver present in effluents produced in the preparation and processing of photographic materials may be recovered by degrading the gelatine chemically, thermally or by biological means. The particles containing silver are separated by filtration, ultrafiltration, sedimentation or centrifugation.

Processes in which organic or inorganic flocculating agents are added to the effluent to form floccules enclosing the silver or silver halide particles may operate with or without degradation of the gelatine. The floccules are isolated by filtration, ultrafiltration, sedimentation or centrifugation and the silver is recovered from the mass. If the gelatine is to be degraded, this is accomplished by chemical, thermal or biological means prior to flocculation.

A physical process is known, in which the silver or silver halide particles are separated from the other substances in the effluent by centrifugation or by reverse osmosis or are concentrated.

Electrolytic processes in which the effluent is first enriched with silver are employed for small quantities of effluent. In other processes used for the removal of silver from solutions containing silver complexes, the solution is brought into contact with a strongly alkaline ion exchange resin, the ion exchange resin is desorbed with a salt solution and the silver is subsequently recovered from the solution by electrolysis.

GB-PS 860,542 discloses a process for the separation of silver halides from aqueous dispersions, in particular from effluent formed in the preparation and casting of photographic silver halide emulsions. In this process, the effluent is mixed with air under pressure and an activated sodium silicate is added. Shortly before or after the pressure in the effluent is released, sodium hydroxide solution is added to form silicon-containing floccules and these floccules are carried to the surface by the air bubbles. The floccules enclose the silver halides which are removed at the surface with the floccules.

This process has the serious disadvantage that a large quantity of chemicals must be added to the effluent for its treatment, so that the total quantity of effluent is increased and the effluent becomes more highly charged with chemicals, also the sodium silicate separated by flocculation must be separated from the flocculated silver.

Another method of desilverization of effluent by electroflotation has been disclosed in the Journal Chemische Industrie (Mar. 29, 1979, page 151). In this process, iron chloride, sodium hydroxide and a flocculating agent are added to the effluent. Iron hydroxide floccules form, which enclose the silver halides. The gas bubbles produced by electrolysis of water cause the floccules to rise to the surface of the tank, where they are removed by suction. The iron hydroxide sludge is treated with acid and heated to 90° C. for from 8 to 9 hours to precipitate the sludge which contains the silver.

The process described is very elaborate and expensive since it is again necessary to add chemicals (iron chloride) and flocculating agent and sodium hydroxide to the effluent. The resulting iron hydroxide sludge is heated with considerable consumption of energy to precipitate the silver-containing sludge. The production of gas bubbles by water electrolysis is very expensive on account of the high energy consumption required.

It is therefore an object of the present invention to provide a process of the type indicated above by which silver and silver compounds may be extensively recovered, easily and inexpensively, from aqueous mixtures of various organic and inorganic substances. The residual silver content in the effluent should preferably be less than 1 mg of silver per liter.

To solve this problem in accordance with the present invention, finely divided, inert gas bubbles are injected into dispersions of silver or silver compounds in the presence of proteins while the pH of the medium is maintained substantially at the isoelectric point of the protein.

It was surprising and not to be expected that the injection of finely divided, inert gas bubbles into the solution or dispersion in the presence of proteins at a pH close to the isoelectric point of the protein would result in the production of a flotate containing all the heterodispersely distributed silver and silver compounds with the exception of slight traces in the effluent. Particles of silver or silver compounds, in particular silver halides, and air bubbles become deposited on the added protein and rise to the surface, where they are removed as froth.

In a preferred process, the protein added to the effluent containing heterodispersely distributed silver and silver compounds, as well as other chemicals, is gelatine.

If gelatine is used, adjustment of the pH to a value close to the isoelectric point of the gelatine results in the formation of gelatine floccules. For photographic gelatines, the pH is in the region of from 3 to 9, depending upon the method of preparation employed, and, in the case of the most commonly used gelatines which have been ashed under alkaline conditions, the pH is from 3 to 5, in most cases about 4.

Photographic effluents, for example, frequently consist of an aqueous mixture at a pH of about 7 containing, inter alia, from 30 to 1200 mg of silver per liter and from 100 to 1200 ppm of gelatine. To adjust the aqueous mixture to the isoelectric point of gelatine of pH 4, an acid is added to the mixture, e.g. an inorganic acid, such as sulphuric or hydrochloric acid.

In one particularly advantageous method of carrying out the process, a surface active agent, in particular a cationic surface active agent is added to the solution or dispersion in a quantity of, for example, from 5 to 30 ppm, depending upon the characteristics of the water. The surface active agent substantially reduces the flotation time or enables a larger quantity of effluent to be desilverized in a given flotation cell.

The cationic surface active agents used are preferably cationic polyelectrolytes added to the effluent in a quantity of about 20 ppm.

The process is surprisingly simple to carry out at temperatures of from 15° to 50° C. Optimum results are obtained at and below a temperature of 20° C., in other words at normal room temperature. If the effluents are produced at elevated temperatures, e.g. at 40° C., energy may be recovered by means of heat exchangers and heat pumps and at the same time the flotation process may be optimized.

Fine sub-division of the gas bubbles in the flotation cell is an advantage for carrying out the flotation process. Numerous pieces of apparatus are known in the industry for this purpose. Since ordinary air may be used as the gas, fine and intensive distribution of the gas in the medium is advantageously carried out, for example, by means of a funnel nozzle which distributes the solution or dispersion into a flotation cell and sucks in the gas.

Such flotation cells with funnel nozzles have been disclosed in DE-A 3,008,476. In addition to efficient distribution of the effluent and air bubbles in the flotation cell, they have the advantage that they suck the air in from the surrounding atmosphere through the nozzle without additional energy expenditure and divide it into minute air bubbles by the nozzle jet, these air bubbles then rising inside the flotation cell to form a froth with the flotate on the surface. When a funnel nozzle is used, the quantity of froth amounts to at the most 2%, generally less than 1%, of the quantity of effluent treated. Biowaters discharged into the sewerage amount to from 98 to 99% of the quantity of effluent used and contain less than 1 mg, under optimum conditions less than 0.1 mg, of silver per liter of effluent.

In order to obtain a highly concentrated flotate, a process is employed which is characterised in that fine and intensive distribution of gas in the medium is obtained by using a gas distribution device by which gas separately supplied under pressure is uniformly distributed in the flotation cell.

Gas distribution devices of this type, such as gas distributor screens, frits, air permeable porous materials, such as sintered metals, sintered plastics, etc. have the advantage of enabling very fine air bubbles to be produced over a large surface area at the bottom of a flotation cell. This requires the use of air under pressure, but very fine air distribution is achieved, whereby the flotation process is intensified when carried out for floating small particles of the order of from 0.1 to 3 μm.

The arrangement of a plurality of flotation cells in series to form a cascade so that flotation of the effluent is carried out in several stages has proved to be advantageous since it enables a given quantity of effluent to be processed in a smaller volume of flotation cells. Increasing the number of stages from 1 to 3 or from 3 to 5 reduces the total volume of an installation to half and is economically advantageous. Any further increase in the number of stages does not significantly reduce the volume required, but substantially reduces the circulation of liquid in each stage and may thereby reduce the investment and operating costs. Thus an increase in the number of stages from 5 to 8 reduces the pump output by 30%.

The process may advantageously also be applied to effluent obtained from the preparation and processing of photographic materials, such as films and photographic paper, since such effluent already contains gelatine. It is then not necessary to add protein or gelatine emulsion to the dispersion to recover the silver and silver halides. If the effluent has been adjusted to the pH corresponding to the isoelectric point of the gelatine, injection of finely divided air while maintaining water circulation is sufficient to separate the gelatine and particles of silver or silver halide on the surface as froth. This separation is accelerated by the addition of a cationically-active polyelectrolyte.

Figure 2:
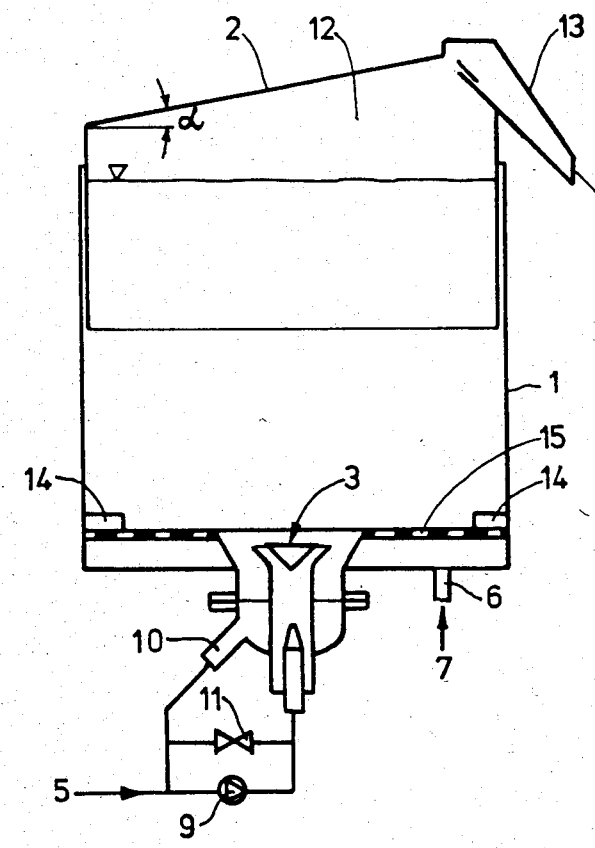
Figure 3:
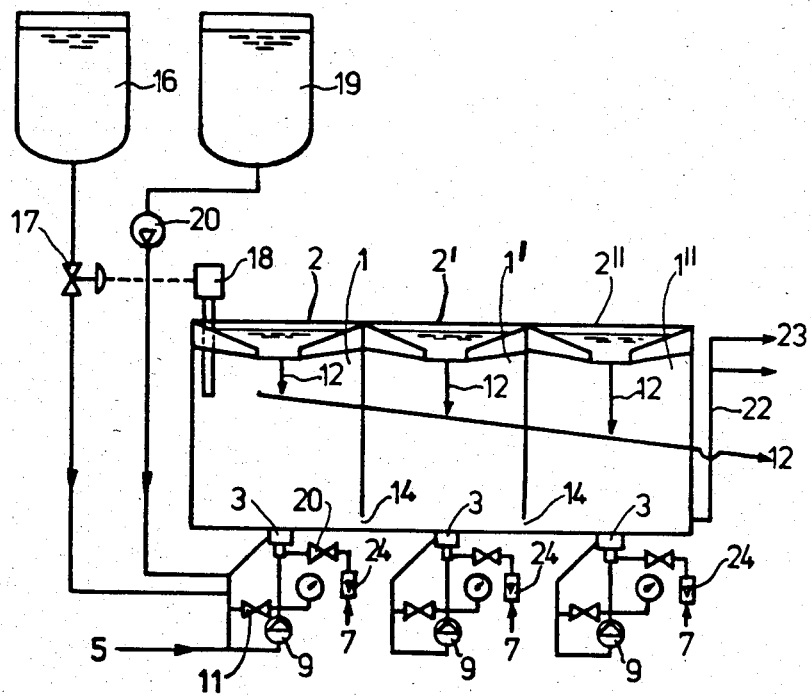
Figure 4:
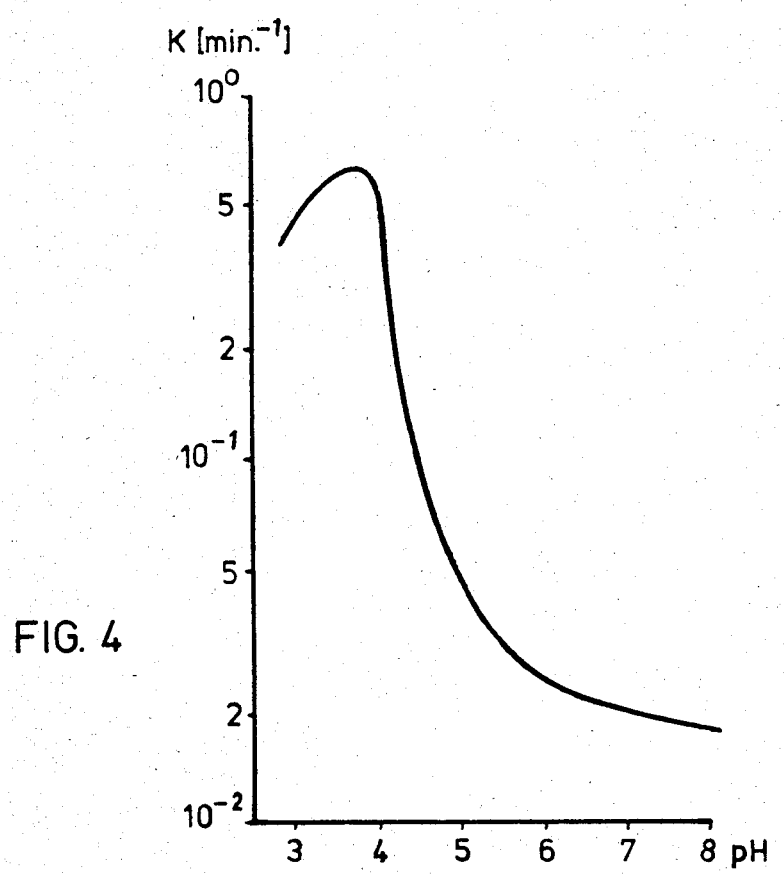
Figure 5:
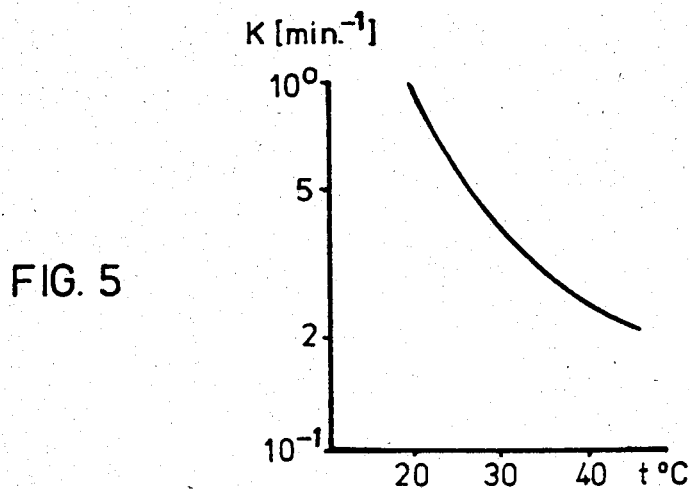

Apparatus suitable for carrying out the process according to the present invention is described below with reference to the drawings, wherein FIG. 1 is a schematic representation of a flotation cell for carrying out the process, FIG. 2 shows a flotation cell with gas distributing device, FIG. 3 shows an arrangement for carrying out the process using three flotation stages of FIG. 1, FIG. 4 represents flotation in dependence upon the isoelectric point, using photographic gelatine as example, and FIG. 5 represents the flotation process in dependence upon the temperature.

FIG. 1 shows a simple and efficient flotation cell. It consists of a container 1, which is preferably rectangular or may be circular, in which is inserted a cover 2 which may be either fixed or capable of moving up and down. The bottom of the container 1 has a flange connection by which a funnel nozzle 3 is attached. The funnel nozzle 3 comprises a nozzle 4 through which the effluent 5 is pumped into container 1 under pressure by a pump 9 so that the nozzle jet sucks in air 7 through the stud 6 and distributes it finely with the effluent 5 in the container 1. A by-pass 10 and valve 11 serve to regulate the quantity of effluent 5 introduced and circulated.

The effluent with finely divided air bubbles 7 leaving the funnel nozzle 3 becomes uniformly distributed in the container and gelatine carrying or containing silver or silver halide particles becomes attached to the air bubbles by affinity, reaches the surface due to the upthrust of air in water, and leaves the effluent as froth 12. Since the cover 2 slopes at an angle α of from 5° to 20°, preferably 10°, and its height above the surface of the effluent is adjustable, the froth 12 becomes compressed and is at the same time forced into an outlet 13 and discharged. The flotation cell may be connected to other flotation cells by connecting ducts 14.

In one advantageous embodiment, the funnel nozzle 3 may also be arranged so that the effluent enters the container 1 from above downwards and the bottom of container 1 is also washed (not shown).

FIG. 2 shows a flotation cell in which the air 7 is forced as compressed air through a stud 6 into the lower part of the container 1, is uniformly distributed over the bottom of container 1 by a suitable material for air distribution 15 and is injected into the effluent 5 as air bubbles. The air distributors 15 used may be screens, frits of glass, plastics or porous material, such as sintered plates of refined steel, plastics or the like. The pore size of the screen apertures depends upon the nature of the effluent to be processed, the height of the container, the rate of throughput of the effluent and the number of flotation cells. It is, of course, also possible and advantageous to combine air injection using the funnel nozzle 3 as shown in FIGS. 1 and 2 with the injection of compressed air 7 and distribution using an air distributor 15. The mode of operation of the flotation cell is similar to that of FIG. 1.

Removal of the froth from the surface of the effluent in container 1 may also be carried out by suction or by means of mechanical froth disintegrators, e.g. according to DE-A 3,088,589, in which the froth is sucked into a rotating head, compressed by centrifugal force and ejected (not shown).

FIG. 3 shows an arrangement for carrying out the process according to the present invention using three flotation cells, 1,1',1".

The effluents 5 introduced, e.g. from the preparation and processing of photographic materials, contain inorganic and organic chemicals and gelatine, as well as silver and silver halides, such as silver bromide, silver iodide or silver chloride, heterodispersely-distributed or various mixtures thereof. The effluents 5 are at a pH of from 7 to 8 and must therefore be acidified to reach the isoelectric point, which, in the case of photographic gelatine, is generally at a pH of about 4. For this purpose, an acid, such as sulphuric acid, is added to the effluent 5 from an acid tank 16 through a valve 17 before the effluent enters the pump 9. The valve 17 is controlled by a pH measuring instrument 18 installed in some suitable position in the first flotation cell 1. A surface active agent, e.g. a cationically-active polyelectrolyte, is introduced into the effluent from a second tank 19 by way of a dosing pump 20 in a quantity of about 20 ppm. The mixture is injected under pressure from the pump 9 through the funnel nozzle 3 into the flotation cell while air 7 is sucked in. The quantity of air may be adjusted by a valve 20 or by governor devices 24. The quantity of the mixture may be adjusted or regulated by the by-pass valve 11 to select the water and air mixture required for optimizing the flotation process.

The flotate is separated in the cover part 2 by the ascending air bubbles and leaves the process through a collecting pipe. The roof construction causes the froth of floated product to be compressed so that the large bubbles burst and the froth loses liquid, the liquid in the froth then amounting to less than 1% of the processed quantity of effluent.

The effluent, already partly desilverized in the first container, enters the second flotation cell 1' through the connecting duct 14 after having circulated one or more times through container 1, and, after further treatment in the second flotation cell, it enters the third flotation cell 1" for its final treatment. As described above, air 7 is supplied at all three stages of the cascade and the effluent is circulated by pumps 9. The desilverized effluent 23 leaves the flotation process through a pipe 22 at the liquid level of the cascade and is fed into a bio-water canal. Since all the containers 1, 1',1" communicate with each other, the level of effluent may be chosen by the height of the discharge opening of the pipe 22.

FIG. 4 shows the dependence of the speed of flotation on the isoelectric point, using a gelatine as an example. The flotation velocity constants K [min$^{-1}$] are plotted on a logarithmic scale against the pH. The graph shows that flotation is most rapid at the isoelectric point of the gelatine, in this case a pH of about 4, and that of the flotation process described may be used over a pH range of from 3 to 5, the pH being slightly higher at lower temperatures than at higher temperatures.

FIG. 5 shows the dependence of flotation velocity on the temperature t of the effluent. The flotation velocity constants K (min$^{-1}$) are plotted on a logarithmic scale against the temperature t. According to this graph, a temperature of 20° C. or less is suitable. Since the region below 20° C. requires cooling of the effluent, this region is economically of less interest. If, however, the effluent is obtained at a temperature of 40° C., cooling to 20° C. is economical since additional thermal energy may be obtained from the warm water by means of heat exchangers and heat pumps. The optimum temperature t is this at the room temperature range of from 16° to 20° C. At 20° C., the maximum flotation velocity is obtained at pH 4.

EXAMPLE

An experimental flotation plant for the continuous recovery of silver from effluent has the following data: Cascade of 3 containers (as indicated schematically in FIG. 3)

cascade volume 6.3 m$^3$
pump output volume 75 m$^3$/h
motor output (pumps) 3.75 kW
quantity of desilverized effluent 9.5 m$^3$/h
air consumption 11 m$^3$/h
consumption of sulphuric acid (48%) 1.5 l/h
polyelectrolyte consumption 0.2 l/h (Praestaminol(®) RO, Fa. Stockhausen)
silver content of the desilverized effluent 1 mg of Ag/l The installation operated as follows: The effluent (5) containing silver was removed from a reservoir by a pump (9) and pumped into the cascade (1, 1'1"). An outflow pipe (22) of adjustable height at the exit from the cascade was used to adjust the filling height of the cascade (1, 1', 1") so that overspill of effluent through the froth discharge hopper (13, FIGS. 1 and 2) could not occur. When effluent discharged at the exit from the cascade had a silver content greater than 1 mg/l, the pump (9) was switched off. The cover 2 of the first cascade (1) was adjusted according to froth produced so that the froth (12) was discharged in as dry a state as possible. Since from about 60 to 90% of the froth (12) was discharged in the first chamber (1) of the cascade, this chamber was provided with a froth disintegrator. After the cascade had been filled with effluent (5) containing silver, the pumps (9) were switched on and the effluent was circulated through the funnel nozzles (3). Air from the surrounding atmosphere was sucked in by the injector action of the funnel nozzles (3) at the rate of 11 m$^3$/h and distributed very finely in the effluent of the particular cascade chamber (1, 1', 1") into which it was introduced. While effluent (5) was pumped into the cascade, introduction of the sulphuric acid from tank (16) was switched on when the cascade was half full and this introduction was dosed to a preadjusted nominal value to reduce the effluent (5) to pH 4, and dosing of the cationically-active polyelectrolytes from container (19) was switched on. To ensure efficient distribution of the acid and of the polyelectrolytes, these substances were fed into the by-pass duct at the suction end before the first circulating pump (9) (see FIG. 3). After a starting period of about 30 minutes and after clarification of the effluent in the flotation plant, the inflow from the effluent reservoir was switched on and continuous flotation was started. This inflow was regulated in dependence upon the silver level at the outflow and was automatically stopped when too much silver leaked through (>1 mg Ag/l). When the process was carried out continuously, the froth (12) containing silver and gelatine was concentrated to a volume amounting to less than 2% of the quantity of effluent put into the process. The froth (12) was further concentrated in a boiling vat and then transferred to the fine recovery of silver. Instead of using the boiling vat, the froth (12) could also have been compressed to a sludge cake by means of a filter chamber press. The desilverized effluent (silver content less than 1 mg/l) was discharged into the sewer. Continuous flotation reduced the silver content in the chambers (1, 1', 1'') of the cascade to approximately the following values:

1st Chamber (1) 80%,
2nd Chamber (1') 19%,
3rd Chamber (1'') 1%.

We claim:

1. A method of continuous separation of silver or silver compounds from protein containing dispersions of silver or silver compounds containing at least about 100 ppm of gelatine which comprises the steps of
   adjusting the pH of the dispersion at or about the isoelectric point of the gelatine,
   forming flocks consisting essentially of the gelatine and silver or silver compounds by maintaining the pH of the dispersion at or about said isoelectric point in the presence of an effective amount of a cationically active polyelectrolyte to aid in separating said flocks,
   and injecting finely divided inert gas bubbles into the dispersion and separating flocks from the remaining dispersion by flotation.

2. The method according to claim 1, characterised in that the pH of the dispersion is adjusted to from 3 to 5.

3. The method according to claim 1, characterised in that the polyelectrolyte is added to the dispersion in a quantity of from 5 to 30 ppm.

4. The method according to claim 1, characterised in that the dispersion is subjected to flotation at a temperature of from 15° to 50° C.

5. The method according to cliam 1, characterised in that a funnel nozzle is used for fine and intensive distribution of gas in the dispersion, which funnel nozzle distributes the dispersion in a flotation cell and sucks in the gas.

6. The method according to claim 1, characterised in that a gas distributing device which uniformly distributes separately-supplied gas in the flotation cell is used for a fine and intensive distribution of the gas in the dispersion.

7. The method according to claim 1, characterised in that flotation is carried out in several stages in flotation cells arranged in series.

8. The method as claimed in claim 1 wherein the quantity of gelatine in the dispersion is in the range of from 100 to 1200 ppm.

9. The method as claimed in claim 1 including the step of prior to the injection of gas bubbles, the gelatine is added to the dispersion and mixed with the dispersion.

10. The method as claimed in claim 1 wherein said inert gas is air.

* * * * *